Patented June 19, 1951

2,557,639

UNITED STATES PATENT OFFICE 2,557,639

ESTERIFICATION WITH ALLYL TYPE ALCOHOLS

Elwood L. Derr, Berkeley, and John C. Illman, Albany, Calif., assignors to Shell Development Company, San Francisco, Calif., a corporation of Delaware No Drawing. Application March 4, 1947, Serial No. 732,386

17 Claims. (Cl. 260—475)

This invention relates to a process of esterification and particularly to the esterification of organic acids with allyl type alcohols.

In conducting esterification reactions, the acid to be esterified, or its anhydride is placed in a reaction vessel with the alcohol and the mixture is heated to esterification temperatures. A catalyst such as a strong mineral acid may be added to the esterification mixture to promote the reaction.

In making esters of allyl type alcohols it has been found that a portion of the alcohol does not react with the acid to form the ester, but undergoes a side reaction to form the corresponding ether. This side reaction to form the ether tends to make the process inefficient and it is desirable to suppress this side reaction as much as possible.

A further difficulty with the usual esterification process is the fact that when the alcohol and acid react, water is formed. The water tends to affect the equilibrium adversely, because of its tendency to hydrolyze the newly formed ester. To overcome this difficulty an azeotrope former may be added to the esterification mixture, so that the water formed may be distilled off as an azeotrope. The use of the azeotrope former is particularly important when alcohols are used, such as allyl alcohol, which have boiling points lower than water. Ordinarily the azeotrope former forms a ternary azeotrope with the water and alcohol, so that all three are taken overhead. The overhead azeotrope may then be placed in a settling vessel where the water settles out, leaving an upper phase consisting primarily of the azeotrope former and the alcohol, which may be returned to the esterification vessel.

It has now been discovered that the ethers of allyl type alcohols are ideal azeotrope formers and their use tends to inhibit the tendency of allyl type alcohols to undergo side reactions and form ethers. Although this invention is not predicated on any theory of its operation, it is believed that the effect of the allyl type ether in suppressing the formation of ether is that of displacing the equilibrium of the reaction so that there is less of the tendency of the alcohol to form the ether. This effect is very important and may be utilized even when one does not remove the water of reaction azeotropically.

In carrying out the present invention, it is preferred to utilize the corresponding ether to the allyl type alcohol which is used to form the ester, e. g. when an allyl ester is formed, the preferred azeotrope former is diallyl ether. However, it has been found that the use of any allyl type ether tends to retard the formation of ethers from the allyl type alcohol used in esterification e. g. when a methallyl ester is formed, dicrotyl ether may be used as the azeotrope former.

Throughout the specification, reference is made to allyl type alcohols and ethers. By allyl type is meant 2-alkenyl compounds having the general formula

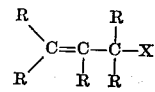

wherein each R is an alkyl radical or hydrogen atom and wherein X is the hydroxyl radical in the case of an alcohol and is an oxygen atom coupled to another allyl type radical in the case of an ether. Representative compounds fitting the above description are found in the next paragraph.

The allyl type alcohols which may be used for the purposes of the present invention have from 3 to 5 carbon atoms, so that the corresponding ethers have from 6 to 10 carbon atoms. Typical of the alcohols which may be used are allyl alcohol, methallyl alcohol, crotyl alcohol, angelyl alcohol and tiglyl alcohol. The corresponding ethers which may be used include diallyl ether, dimethylallyl ether, dicrotyl ether, diangelyl ether and ditiglyl ether. In addition, asymmetric ethers may be used such as allyl methallyl ether and crotyl methallyl ether. However, the asymmetric ethers possess no particular advantages and are ordinarily less readily available than the symmetric ethers so that it is ordinarily preferable to use symmetric ethers.

The present invention is applicable to any organic carboxylic acid which is capable of being esterified with allyl type alcohols, and is particularly applicable to dicarboxylic and polycarboxylic acids. A preferred group of organic acids are those having not over eighteen carbon atoms. Suitable monocarboxylic acids include formic, acetic, propionic, n-butyric, benzoic, isobutyric, n-valeric, o-, m- or p-toluic, trimethylacetic, caproic, n-heptylic, caprylic, pelargonic, lauric, myristic, palmitic, stearic, palmitoleic, oleic, ricinoleic and the like. Suitable dicarboxylic and polycarboxylic acids include maleic, phthalic, isophthalic, terephthalic, succinic, oxalic, malonic, glutaric, adipic, pimelic, suberic, azelaic, sebacic, hemimellitic, trimellitic, trimesic, prehnitric and similar acids.

In the case of those acids which form anhydrides, the anhydride may be used to form the ester and throughout the specification when reference is made to the use of acids it is understood to include the use of anhydrides in forming the esters. Often the use of the anhydride is prefered, in that less water is formed in the esterification reaction. Suitably anhydrides include acetic anhydride, propionic anhydride, n-butyric anhydride, n-valeric anhydride, stearic anhydride, succinic anhydride, benzoic anhydride, phthalic anhydride and the like. Similarly, in the case of polycarboxylic acids, the partial ester may be used as the starting material. Thus one may react phthalic anhydride with allyl alcohol to produce monoallyl phthalate and use the monoallyl phthalate as the starting material for performing the present invention.

The operation of the present invention is substantially like other esterification reactions and may be done in a batchwise or continuous manner. When operating in the batchwise manner, the acid or anhydride is placed in a reaction vessel with the alcohol and azeotrope former together with the catalyst, if a catalyst is used. The vessel should be supplied with suitable heating means and preferably is equipped with fractionating column. The reaction may be carried out at subatmospheric, atmospheric or superatmospheric pressures. Inasmuch as the esterification reaction is more rapid at elevated temperatures, it is preferred to operate at atmospheric or moderately elevated pressures. When the reaction vessel is heated, the reaction commences and an azeotrope consisting of alcohol, azeotrope former and the water of esterification will be formed as a vapor and taken off. The azeotrope which is formed may then be condensed, whereupon two phases will be formed, namely an upper phase consisting primarily of alcohol and the azeotrope former and a lower phase consisting primarily of water. The phases may be separated and the upper phase consisting of alcohol and azeotrope former may be returned to the esterification vessel. After the esterification has gone substantially to completion, the returning of the upper phase may be stopped, but heating should be continued for a sufficient period of time to drive off any unreacted alcohol, azeotrope former and water. In this manner, the final contents of the esterification vessel will consist almost entirely of the desired ester.

If desired, the alcohol and azeotrope former need not be added to the esterification vessel all at once. The acid or anhydride may be placed in the vessel and heated to the desired esterification temperature and the alcohol and azeotrope former may then be added slowly to the vessel.

The amounts of materials added to the esterification vessel are not critical. Generally the amount of alcohol is somewhat in excess of the stoichimetric quantity necessary to react with the acid. Thus, when phthalic anhydride and allyl alcohol are to be esterified, it is suitable to add about 2.5 moles of alcohol per mole of anhydride. With a monocarboxylic acid the quantity of alcohol would, of course, be about half this quantity. The amount of the azeotrope former to be added should be sufficient to form an azeotrope with the water of esterification as it is formed but, since the azeotrope former may be recycled, does not need to be sufficient to form an azeotrope with all of the water at one time.

The quantity is not critical but if too much is used it will unduly dilute the reaction mixture, while if too little is used the water will not be carried off as rapidly as formed. Ordinarily from about 0.1 to 0.5 volume of the azeotrope former should be used per volume of alcohol. This amount would have to be increased if the azeotrope former is not recycled.

The temperature at which the esterification is conducted may be the usual temperature for promoting such reactions but must at least be higher than the boiling temperature of the azeotropic mixture which is formed and should be less than the boiling temperature of the acid or anhydride which is used as the starting material of the ester which is formed. When making diallyl phthalate from allyl alcohol and phthalic anhydride, a temperature of from 105° C. to 160° C. has been found suitable.

One advantage of diallyl ether as an azeotroping agent in the preparation of allyl esters is the fact that the azeotrope boils at a low temperature compared with other well known azeotroping agents. Thus the azeotrope diallyl ether-water-allyl alcohol boils at 77.8° C. while the azeotrope toluene-allyl alcohol-water boils at 80.0° C. Thus the former permits operation at somewhat lower temperatures. A further advantage is that the azeotrope, upon condensation, forms two phases, the upper of which contains little water as the following comparison shows:

|  | Diallyl Ether Azeotrope (22° C.) | Toluene Azeotrope (20° C.) |
| --- | --- | --- |
| *Upper Layer* | Per cent | Per cent |
| Allyl alcohol | 8.6 | 24.1 |
| Water | 1.4 | 2.5 |
| Diallyl ether | 90.0 |  |
| Toluene |  | 73.4 |
| *Lower Layer* |  |  |
| Allyl alcohol | 10 | 27.4 |
| Water | 89.5 | 72.3 |
| Diallyl ether | 0.5 |  |
| Toluene |  | 0.3 |

When using diallyl ether as the azeotroping agent, the upper phase which is recirculated contains only 1.4% water as against 2.5% in the case of toluene. Further, the lower phase which is discarded or reclaimed contains only 10% of alcohol in the case of diallyl ether, while it contains 27.4% alcohol in the case of toluene.

Since diallyl ether is one of the products of the esterification of phthalic acid with allyl alcohol, it is advantageous to employ diallyl ether as an azeotrope former for the reason that if another azeotrope former, such as benzene, were used it would be necessary to provide means for separating the benzene from the diallyl ether.

*Example*

Three esterification runs were made to compare the use of diallyl ether with benzene as an azeotrope former in the manufacture of diallyl phthalate. In each run the catalyst was 1 gram of sulfuric acid per 100 grams of phthalic anhydride, the mole ratio of allyl alcohol to phthalic anhydride was 2.5 to 1, and the reaction temperature was maintained at 140° C. In runs 1 and 2, diallyl ether was used as the azeotrope former, while in run No. 3, 1500 grams of benzene was used as the azeotrope former. The following results were obtained.

| Run No. | Reaction time, hours | Allyl alcohol in— | | Diallyl ether in, grams | Diallyl ether out, grams | Diallyl ether formed | | Allyl alcohol converted to diallyl ether |
|---|---|---|---|---|---|---|---|---|
| | | grams | moles | | | grams | moles | |
| | | | | | | | | Per Cent |
| 1 | 10 | 8,400 | 145 | 990 | 1,870 | 850 | 8.98 | 12.4 |
| 2 | 6 | 7,900 | 136 | 1,460 | 2,238 | 778 | 7.95 | 11.7 |
| 3 | 7 | 8,450 | 146 | none | 1,021 | 1,021 | 10.42 | 14.3 |

It will be seen from the comparison of runs 1 and 2 with run 3 that the use of diallyl ether as an azeotrope former results in a lessened formation of diallyl ether by the undesirable side-reaction of allyl alcohol. It will also be noted from a comparison of runs 1 and 2 that when more of the ether is used as an azeotrope former, less of the ether is formed by the reaction.

We claim as our invention:

1. In the process of forming an ester of an organic carboxylic acid with a 2-alkenyl alcohol wherein a member chosen from the group consisting of organic carboxylic acids and anhydrides of organic carboxylic acids are reacted with a 2-alkenyl alcohol, the improvement comprising conducting the esterification in the presence of a substantial amount of an added 2-alkenyl ether.

2. The process of claim 1 wherein the added 2-alkenyl ether corresponds in carbon skeleton to two molecules of the 2-alkenyl alcohol.

3. In the process of forming a 2-alkenyl ester of an organic carboxylic acid by direct esterification wherein a 2-alkenyl alcohol having from 3 to 5 carbon atoms is esterified with a member chosen from the group consisting of organic carboxylic acids and anhydrides of organic carboxylic acids the improvement comprising conducting said esterification in the presence of a substantial amount of an added 2-alkenyl ether having from 6 to 10 carbon atoms.

4. In the process of forming an ester of an organic carboxylic acid by direct esterification wherein a member chosen from the group consisting of organic carboxylic acids and anhydrides of organic carboxylic acids is reacted with an alcohol having not over 5 carbon atoms having the general formula:

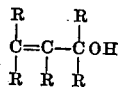

wherein each R is a member of the group consisting of the hydrogen atom and lower alkyl radicals, the improvement comprising conducting the esterification in the presence of a substantial amount of an added ether having not over 10 carbon atoms of the general formula:

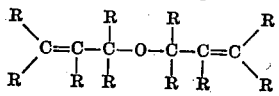

wherein R is a member chosen from the group consisting of the hydrogen atom and lower alkyl radicals.

5. The process of claim 4 wherein the added ether corresponds in carbon skeleton to two molecules of the alcohol.

6. In the process of forming a 2-alkenyl ester of an organic carboxylic acid by direct esterification wherein a 2-alkenyl alcohol having from 3 to 5 carbon atoms is esterified with a member chosen from the group consisting of organic carboxylic acids and anhydrides of organic carboxylic acids, the improvement comprising conducting said esterification in the presence of a substantial amount of an added 2-alkenyl ether having from 6 to 10 carbon atoms and conducting said esterification at an elevated temperature whereby there is formed a ternary azeotrope consisting of said alcohol, said ether and water of esterification, and separating said azeotrope from the other reactants.

7. A process for forming an ester comprising placing in a reaction zone a member chosen from the group consisting of organic carboxylic acids and anhydrides of organic carboxylic acids with a 2-alkenyl alcohol having from 3 to 5 carbon atoms and a 2-alkenyl ether having from 6 to 10 carbon atoms, heating said reaction zone to esterifying temperatures whereby there is produced an ester and an azeotropic vapor, removing said vapor from the reaction zone and condensing it to produce two liquid layers and returning the upper layer to the reaction zone.

8. The process of claim 7 wherein the 2-alkenyl ether corresponds in carbon skeleton to two molecules of the 2-alkenyl alcohol.

9. In the process for the manufacture of allyl esters by direct esterification the improvement comprising carrying on said esterification process in the presence of an added quantity of a 2-alkenyl ether having from 6 to 10 carbon atoms as an azeotrope former to remove the water produced in esterification, said added quantity of 2-alkenyl ether being over and above any quantity of said ether which may be formed during the esterification process.

10. In the process for the manufacture of allyl esters by direct esterification, the improvement comprising carrying on said esterification process in the presence of an added quantity of diallyl ether as an azeotrope former to remove the water produced in esterification, said added quantity of diallyl ether being over and above any quantity of said ether which may be formed during the esterification process.

11. In the process of making diallyl phthalate by direct esterification, the improvement comprising carrying on said esterification process in the presence of an added quantity of a 2-alkenyl ether having from 6 to 10 carbon atoms as an aezotrope former to remove the water produced in esterification, said added quantity of 2-alkenyl ether being over and above any quantity of said ether which may be formed during the esterification process.

12. In the process of making diallyl phthalate by direct esterification the improvement comprising carrying on said esterification process in the presence of an added quantity of diallyl ether as an azeotrope former to remove the water produced in esterification, said added quantity of diallyl ether being over and above any quantity of said ether which may be formed during the esterification process.

13. In the process of producing diallyl maleate by direct esterification, the improvement comprising carrying on said esterification process in the presence of an added quantity of diallyl ether as an azeotrope former to remove the water produced in esterification, said added quantity of diallyl ether being over and above any quantity of said ether which may be formed during the esterification process.

14. A process for the production of diallyl phthalate comprising placing in a reaction vessel allyl alcohol, phthalic acid and diallyl ether, heating the mixture to a temperature of from 105° C. to 160° C. whereby there is produced an azetropic vapor comprising allyl alcohol, water and diallyl ether, and removing said vapor from the reaction vessel.

15. A process for the production of diallyl phthalate comprising placing in a reaction vessel allyl alcohol, phthalic acid and diallyl ether, heating the mixture to a temperature of from 105° C. to 160° C. whereby there is produced an azeotropic vapor comprising alyl alcohol, water and diallyl ether, and removing said vapor from the reaction vessel and condensing it whereby two liquid layers are formed and returning the upper liquid layer to the reaction vessel.

16. A process for the production of diallyl phthalate comprising placing in a reaction vessel allyl alcohol, phthalic anhydride and diallyl ether, heating the mixture to a temperature of from 105° C. to 160° C. whereby there is produced an azeotropic vapor comprising allyl alcohol, water and diallyl ether and removing said vapor from the reaction zone.

17. In the process of making a high boiling ester by direct esterification of a polycarboxylic acid and allyl alcohol, the improvement comprising carrying on said esterification in the presence of an added quantity of diallyl ether as an azeotrope former to remove the water produced in esterification, said added quantity of diallyl ether being over and above any quantity of said ether which may be formed during the esterification process.

ELWOOD L. DERR.
JOHN C. ILLMAN.

REFERENCES CITED

The following references are of record in the file of this patent:

UNITED STATES PATENTS

| Number | Name | Date |
|---|---|---|
| 1,864,893 | Crowell et al. | June 28, 1932 |
| 2,249,768 | Kropa | July 22, 1941 |